United States Patent
Wodrich (10) Patent No.: US 10,534,081 B2
(45) Date of Patent: Jan. 14, 2020

(54) MOUNTING SYSTEM FOR VEHICLE SHORT RANGE SENSORS

(71) Applicant: MAGNA ELECTRONICS INC., Auburn Hills, MI (US)

(72) Inventor: Helmut A. Wodrich, Clarkston, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 317 days.

(21) Appl. No.: 15/584,265

(22) Filed: May 2, 2017

(65) Prior Publication Data

US 2017/0315231 A1 Nov. 2, 2017

Related U.S. Application Data (60) Provisional application No. 62/330,557, filed on May 2, 2016.

(51) Int. Cl.
*G01S 13/93* (2006.01)
*H01Q 17/00* (2006.01)
(Continued)

(52) U.S. Cl.
CPC ........ *G01S 13/931* (2013.01); *B60W 2420/52* (2013.01); *G01S 2007/027* (2013.01); *G01S 2013/9314* (2013.01); *G01S 2013/9332* (2013.01); *G01S 2013/9342* (2013.01); *G01S 2013/9346* (2013.01);
(Continued)

(58) Field of Classification Search
CPC ... B60R 11/00; B60R 19/48; B60R 2011/004; B60R 2021/01006; B60R 21/0136; B60C 23/0408; G01S 17/08; G01S 7/4811; G01S 7/521; G01S 13/91; G01S 13/93; G01S 2013/9371; G01S 2007/027; G01S 3/784; G01S 13/931; B60Q 1/302; B60Q 3/30;
(Continued)

(56) References Cited

U.S. PATENT DOCUMENTS 5,326,133 A * 7/1994 Breed ................... B60R 19/483
                                                     180/274
5,949,331 A    9/1999 Schofield et al.
(Continued)

FOREIGN PATENT DOCUMENTS

WO    2011090484 A1    7/2011

*Primary Examiner* — Olumide Ajibade Akonai
(74) *Attorney, Agent, or Firm* — Honigman LLP (57) ABSTRACT

A sensing system of a vehicle includes a control and a mounting carrier that supports a plurality of sensor units. The mounting carrier is configured to be disposed at the vehicle so that the plurality of sensor units have respective fields of sensing exterior of the vehicle. The mounting carrier includes structure to support the sensor units at an exterior structure of the vehicle so as to provide a desired field of sensing. The mounting carrier includes an electrical connector that is configured to electrically connect to an electrical connector of the vehicle. The sensor units are electrically connected to a circuit element that is electrically connected to the electrical connector of the mounting carrier. The control, responsive to outputs of the circuit element, determines the presence of one or more objects exterior the vehicle and within the field of sensing of at least one of the sensor units.

19 Claims, 6 Drawing Sheets

(51) Int. Cl.
 *G01S 7/02* (2006.01)
 *H01Q 1/32* (2006.01)
(52) U.S. Cl.
 CPC .......... *G01S 2013/9371* (2013.01); *G01S 2013/9375* (2013.01); *G01S 2013/9378* (2013.01); *G01S 2013/9389* (2013.01); *H01Q 1/3291* (2013.01); *H01Q 17/00* (2013.01)
(58) Field of Classification Search
 CPC ... B60Q 9/006; B60Q 9/008; B60W 2420/52; H01Q 17/00; H01Q 1/52
 See application file for complete search history.

(56) References Cited

U.S. PATENT DOCUMENTS

| | | | |
|---|---|---|---|
| 6,496,138 B1 * | 12/2002 | Honma | G01S 13/931 342/27 |
| 6,508,325 B1 * | 1/2003 | Schwarz | B60Q 9/006 180/167 |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,729,429 B2 * | 5/2004 | Takahashi | B60R 19/483 180/271 |
| 6,825,455 B1 | 11/2004 | Schwarte | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,954,866 B2 * | 6/2011 | Barcomb | B60R 19/02 293/102 |
| 8,013,780 B2 | 9/2011 | Lynam | |
| 8,027,029 B2 | 9/2011 | Lu et al. | |
| 9,575,160 B1 | 2/2017 | Davis et al. | |
| 9,653,796 B2 * | 5/2017 | Pleva | H01Q 1/526 |
| 9,828,036 B2 * | 11/2017 | Frayer | B62D 25/082 |
| 9,963,085 B2 * | 5/2018 | Smith | B23P 6/00 |
| 2002/0067305 A1 * | 6/2002 | LeBlanc | B60K 31/0008 342/198 |
| 2010/0245066 A1 | 9/2010 | Sarioglu et al. | |
| 2012/0169526 A1 * | 7/2012 | Reilhac | B60W 50/0098 342/70 |
| 2014/0111370 A1 * | 4/2014 | Aleem | B60R 19/483 342/70 |
| 2017/0222311 A1 | 8/2017 | Hess et al. | |
| 2017/0254873 A1 | 9/2017 | Koravadi | |
| 2017/0276788 A1 | 9/2017 | Wodrich | |

\* cited by examiner

FIG. 4 picoRAD Sensor Ass'y

MOUNTING SYSTEM FOR VEHICLE SHORT RANGE SENSORS

CROSS REFERENCE TO RELATED APPLICATION

The present application claims the filing benefits of U.S. provisional application Ser. No. 62/330,557, filed May 2, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

Current radar sensors for vehicle corner applications are typically limited in their functionality, based on the design of the device and the location on the vehicle. There are typically narrow constraints on the physical location, relative the direction of travel of the vehicle, under which the software for the systems function and the antenna configuration are able to fulfill the functional requirements of applications. These constraints limit the number of functions and applications that a specific radar sensor can be used for in automatic driver assistance system (ADAS) applications. This has resulted in radars designed specifically for a given application.

Figure 1:
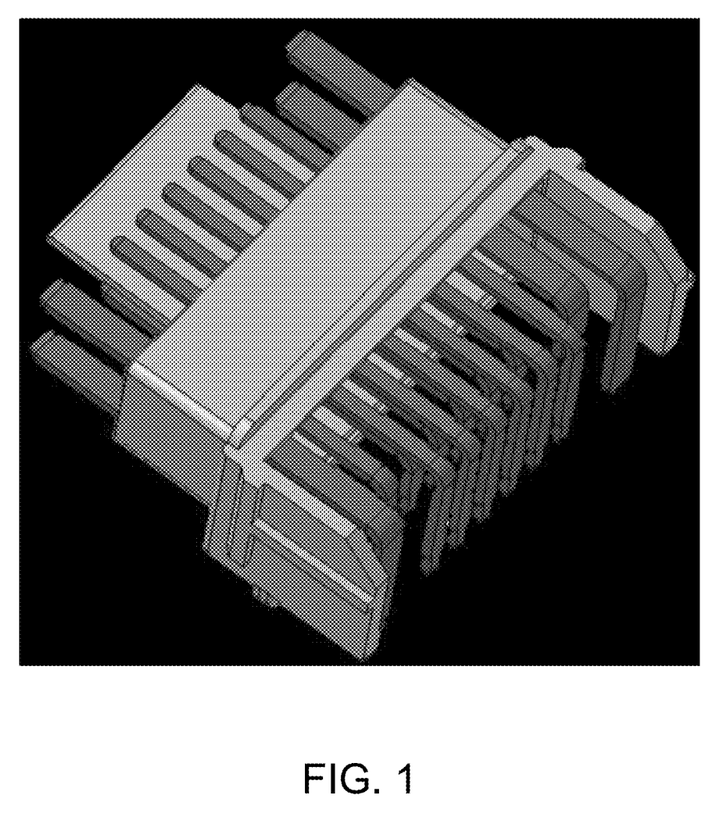
FIG. 1 is a perspective view of an insert molded electrical connector for a known sensing system.

The design of electrical circuits within housings using over molding and insert molding technics is common practice for switches and other electrical devices (see FIG. 1). Such designs permit electrical connections to be made, while insulating circuits within the device.

SUMMARY OF THE INVENTION

The present invention provides a driver assistance system or sensing system for a vehicle that utilizes one or more short range ranging sensors (such as RADAR sensors or the like) disposed at the vehicle to sense respective regions exterior of the vehicle, with the sensors or sensor units comprising According to an aspect of the present invention, individual sensors are positioned in a carrier bracket to provide an expanded field of sensing or Field of View (FOV) for the array of sensors greater than the individual sensors. The resulting FOV is then the FOV of the individual sensor plus the Horizontal Included Angle (HIA) between sensors. It is envisioned that in placing sensors around the rear or front corners of the bumper/fascia, a FOV greater than 180 degrees could be achieved. In addition, by placing the individual sensors at different heights within the carrier bracket, the sensing system may obtain height data (such as height of objects), that could be relevant for pedestrian detection and object classification, curb detection, clearance information and/or the like. This capability could be further enhanced by placing the sensors with a Vertical Included Angle (VIA).

The carrier bracket of the present invention permits the use of standard sensing devices to be easily customized for vehicle design attributes (corner profiles, fascia shape, styling aspects, etc.). By maintaining a standard sensor capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors may be realized with wiring harness or pigtails integrated to the carrier bracket.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or object detection system and/or alert system operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and provide an output to a control that, responsive to the output, generates an alert or controls an accessory or system of the vehicle, or highlights or overlays an alert on a display screen (that may be displaying video images captured by a rearward viewing camera of the vehicle during a reversing maneuver of the vehicle).

Sensors are often disposed at the vehicle exterior for sensing exterior of the vehicle. Vehicle manufacturers employ techniques such as painting, black color matching within the front grill of the vehicle and placement into rear lights (red) to improve styling aesthetics. Ultrasonic systems may be capable of transmission through the plastic fascia to eliminate the visible cues deemed undesired by vehicle styling groups. Vehicle manufacturers continue to be interested in technologies that could eliminate visible sensors, yet provide equal function for a similar cost. The present invention provides a mounting system for short ranges sensors that provides enhanced and uniform mounting at a vehicle bumper/fascia, as discussed below.

The sensors used with the mounting system of the present invention may utilize aspects of the sensors described in U.S. patent application Ser. No. 15/467,247, filed Mar. 23, 2017, which is hereby incorporated herein by reference in its entirety. The vehicle sensing system utilizes one or more sensors to provide a field of view around a vehicle. In the applications envisioned in U.S. patent application Ser. No. 15/467,247, the sensors are generally distributed around the vehicle. Applications are envisioned where multiple sensors would be positioned at an accurately located position in close proximity to one another. Custom sensors could be realized by combining the sensing elements, but may necessitate RF certification (in multiple countries) for each new configuration and implementation, possibly creating cost and delay in developing and implementing new sensing solutions. In developing custom sensors, these would need to be designed specifically to fit the geometry of the bumper fascia. These RF certifications would be necessary to obtain FCC, ECC and other local authorization prior to sale of the product.

In accordance with the present invention, individual sensors are positioned in a carrier bracket to provide an expanded Field of View (FOV) for the array of sensors greater than the individual sensors. The resulting FOV is then the FOV of the individual sensors plus the Horizontal Included Angle (HIA) between the sensors. It is envisioned that in placing sensors around the rear or front corners of the exterior body portion of the vehicle, such as at the corners of a front bumper/fascia of the vehicle, a FOV greater than 180 degrees may be achieved. In addition, by placing the individual sensors at different heights within the carrier bracket, the sensing system could obtain height data (such as height of objects), that could be relevant for pedestrian detection and object classification, curb detection, clearance information and/or the like. This capability may be further enhanced by placing the sensors with a Vertical Included Angle (VIA).

Figure 2:
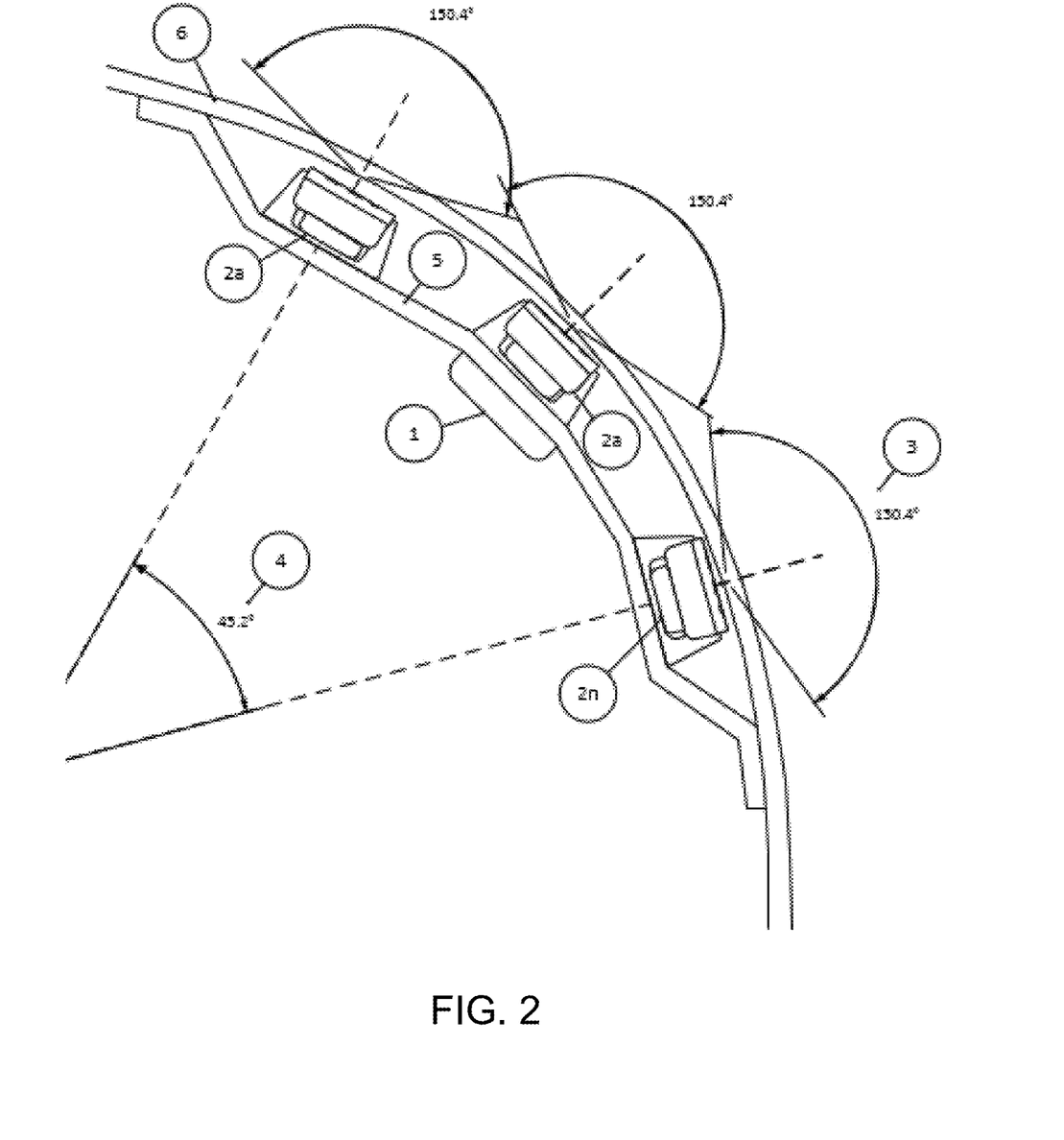
FIG. 2 is a top view of a vehicle bumper/fascia with a mounting system for multiple short range sensors in accordance with the present invention.

Individual sensors may be limited in the Field of View (FOV) available due to the limitations of planar antennas. As shown in FIG. 2, using a carrier bracket 1, multiple sensors 2 may be positioned accurately in an array of "n" sensors to increase the horizontal and/or vertical FOV. In accordance with the present invention, individual sensors with a FOV 3 of about 150 degrees are positioned at the carrier bracket, with a horizontal included angle 4 (HIA) between the sensors at the extreme ends of the bracket. Accordingly, the FOV of any specific array of sensors would be approximately the "Total Average FOV of Sensor+Included Opening Angle." The resulting FOV according to the example is about 195 degrees. It is envisioned that in placing sensors around the rear or front corners of the bumper/fascia, a FOV approaching 240 degrees could be achieved.

Figure 3:
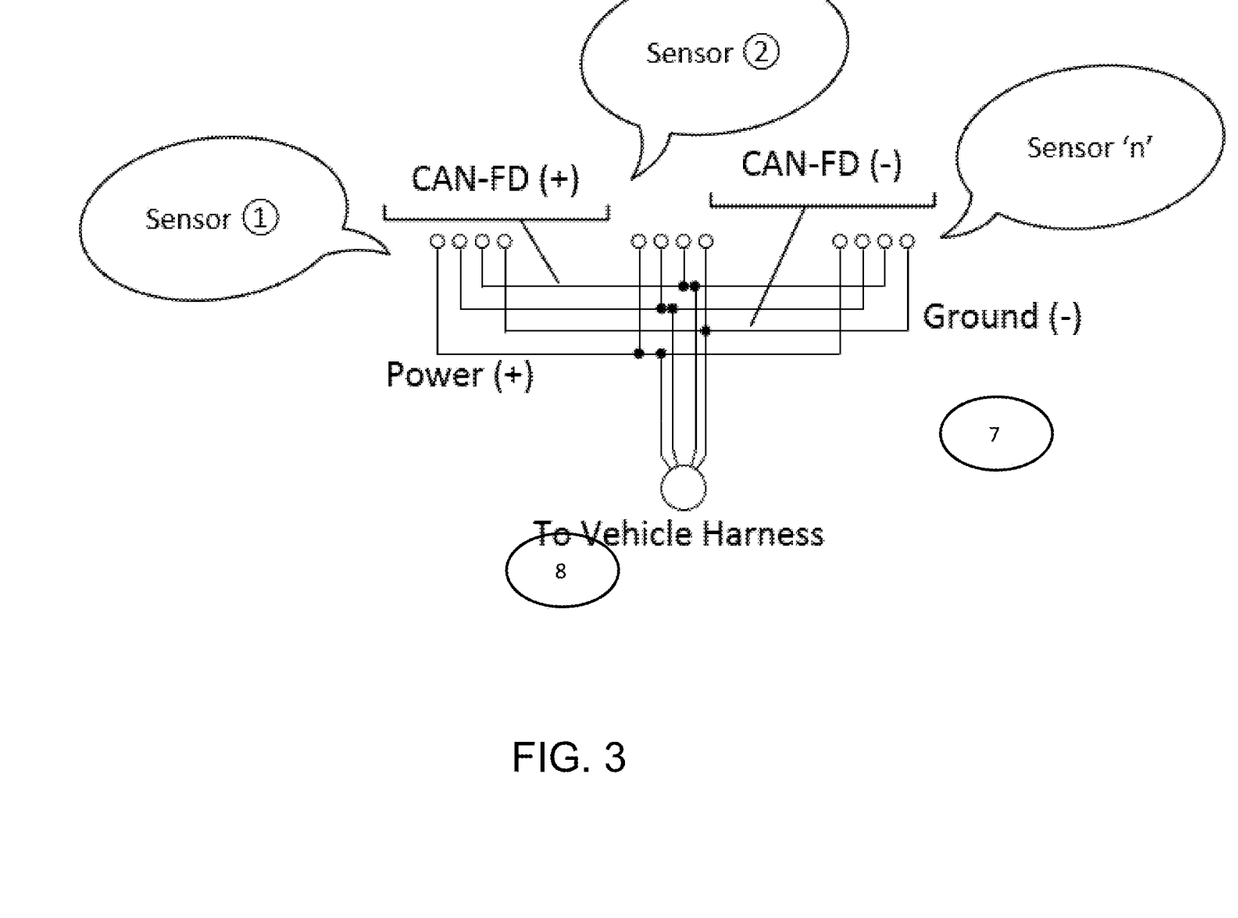
FIG. 3 is a schematic of a circuit that may be insert molded in a carrier bracket of the present invention.

In the application envisioned, the sensors would be connected to a carrier bracket 1 that would provide the following features:
  lead frame for electrical connectivity 7 (FIG. 3);
  connection to permit installation and replacement 8 (FIG. 3);
  positional alignment of each sensor in elevation, separation (distance between sensors), HIA, and VIA; and
  attachment to the bumper/fascia 6.

Figure 4:
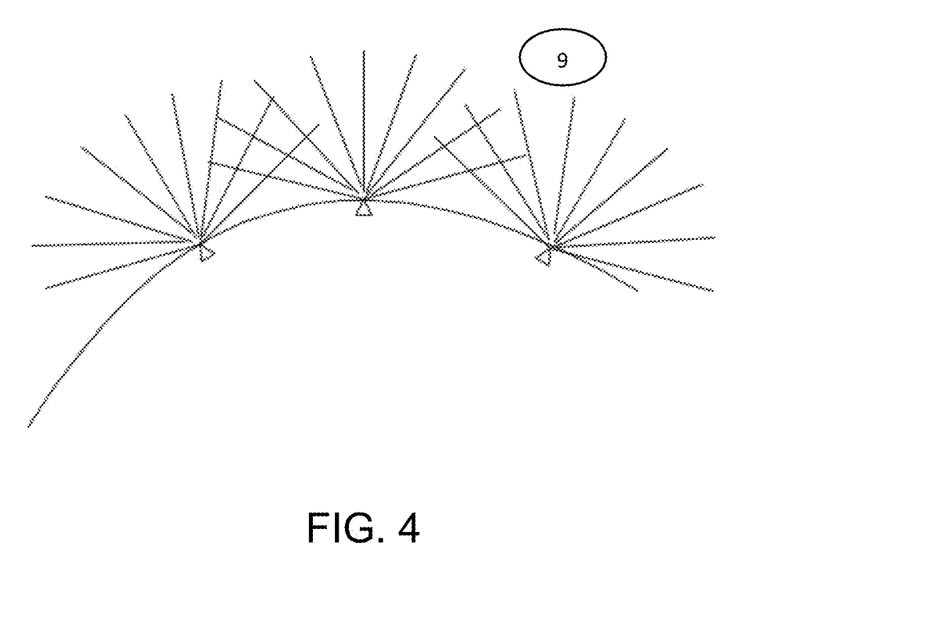
FIG. 4 is a schematic showing multiple sensors at a corner region of a vehicle bumper/fascia with a long baseline Interferometry based on the multiple sensors' interlaced fields of view.
Figure 5:
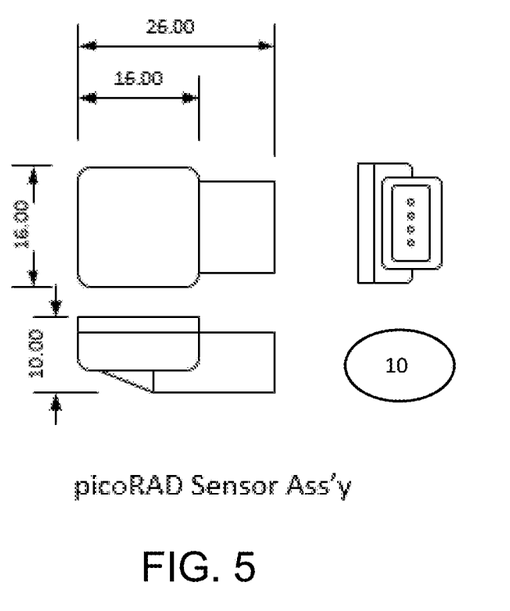
FIG. 5 are views of a standardized short range radar sensor suitable for use with the mounting system of the present invention.

Multiple standardized short range radar sensors 10 (FIG. 5) may be placed at the bracket on a vehicle to provide complete corner coverage for the vehicle. Due to the wider field of view and the ability for radar sensors to detect objects in closer proximity to the bumper fascia, the coverage provided would be greatly improved relative to existing technologies. Through the use of long baseline interferometry and interlacing fields of view 9 (FIG. 4), increased positional accuracy could be realized and point cloud mapping could be used to provide a precise classification of the situation and surrounding objects.

Thus, the present invention provides a carrier bracket that provides for the positioning of an array of radar sensors in accurate location relative to one another. The carrier bracket is attached at a bumper/fascia of a vehicle, such as by using ultrasonic, adhesive, thermal bonding or other similar means to position the bracket on the vehicle. The carrier bracket includes integrated electrical connections and circuits to support an array of sensors, with the circuits and electrical connections integrated in the carrier bracket such as by using an insert molding process. The electrical connection of the sensors may be achieved with a wiring harness of the vehicle electrically connecting to an integrated electrical connector (and circuitry) of the carrier bracket.

The present invention also allows for mounting of an array of sensors, which may be arranged or positioned to provide a horizontal FOV greater than the horizontal FOV of the individual sensors. The array of sensors are positioned to provide a vertical FOV greater than the vertical FOV of the individual sensors. Optionally, the sensing system may comprise sensor arrays connected to a center ECU that is capable of process detection of individual sensors, combining detections within the antenna patterns of horizontal interlaced sensor FOV's to provide an improved positional accuracy. Optionally, the sensing system may comprise sensor arrays connected to the center ECU that is capable of process detection of individual sensors, combining detections within the antenna patterns of vertical interlaced sensor FOV's to provide an improved positional object height measurement and three dimensional (3D) imaging.

The sensing system (mounted at a vehicle via the mounting system of the present invention) is thus capable of providing short range function ADAS functions without sensing components visible on the external surfaces of the vehicle. The system mounts or deploys two or more RF based sensors to provide 360 degrees coverage around a vehicle, and connected using a high bandwidth communication protocol or proprietary network communication protocol. The sensing system supports either sequential transmission or simultaneous transmission of all sensors or groups of sensors providing coverage within the FOV. The sensing system thus deploys two or more RF based sensors to collaboratively provide short range detection for functions such as automated parking, blind spot detection, cross traffic alert, lane change and merge aid, automatic emergency braking, pedestrian detection, turn assist, intersection collision mitigation, and/or the like.

Therefore, the present invention provides a carrier bracket that permits the use of multiple sensing devices, and that can be easily customized for vehicle design attributes (corner profiles, fascia shape, styling aspects). By maintaining a standard sensor capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors maybe realized with wiring harness or pigtails integrated to the carrier bracket.

Figure 7:
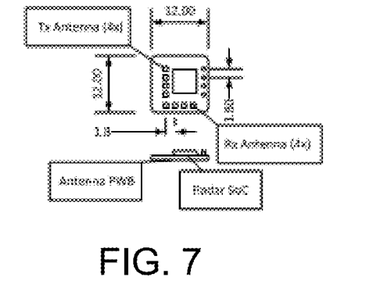
FIG. 7 is a plan view of an integrated antenna PWB assembly suitable for use with the mounting system shown in FIG. 6.

Optionally, instead of complete sensors, the system may include antenna boards (FIG. 7) installed directly into the insert molded bracket, providing both the housing and the interconnecting element. Additionally, the system may include localized ECU processing for either base consolidation of the raw data into object lists or full feature processing. For example, and such as shown in FIG. 7, individual antenna PWB (printed wiring board) assemblies are positioned in a carrier bracket to provide an expanded field of view (FOV) for the array of antenna greater than the individual antenna. The resulting FOV is then the FOV of the individual antennas plus the Horizontal Included Angle (HIA) between the antennas. It is envisioned that in placing antennas around the rear or front corners of the bumper/fascia, a FOV greater than 180 degrees may be achieved. In addition, by placing the individual antennas at different heights within the carrier bracket, the sensing system could obtain height data (such as height of objects), that could be relevant for pedestrian detection and object classification, curb detection, clearance information and/or the like. This capability may be further enhanced by placing the antennas with a Vertical Included Angle (VIA).

Figure 6:
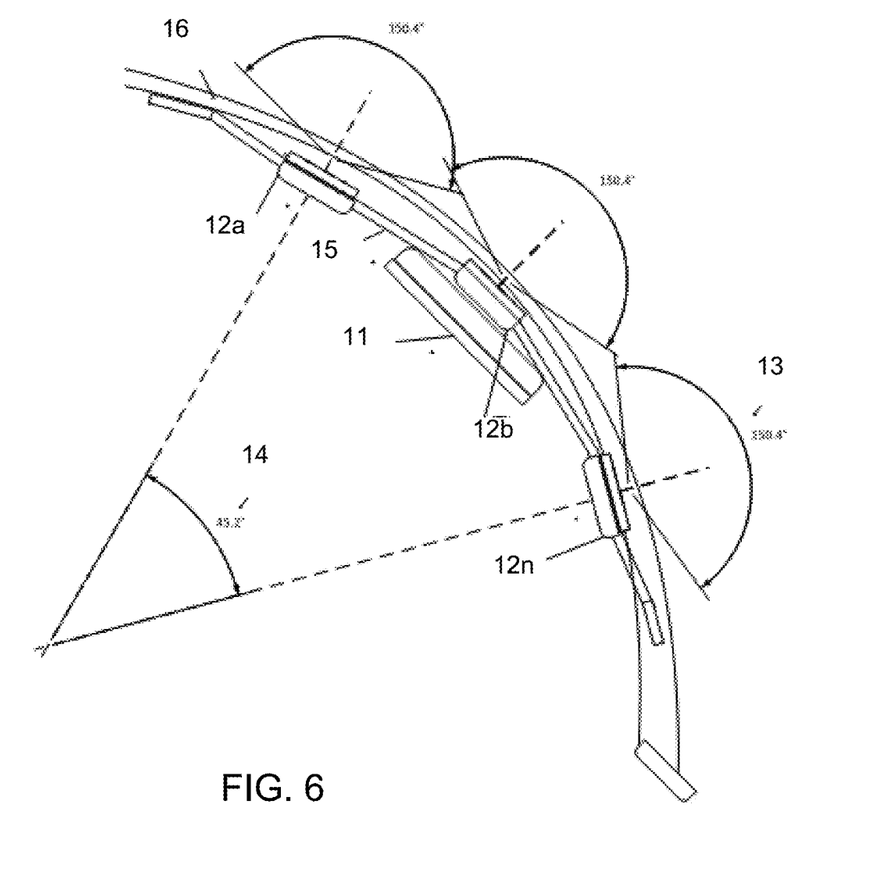
FIG. 6 is a top view of a vehicle bumper/fascia with integrated antenna PWB assemblies within an insert molded mounting system for multiple short range sensors in accordance with the present invention.

Individual antennas may be limited in the Field of View (FOV) available due to the limitations of planar antennas. As shown in FIG. 6, using a carrier bracket 15 (that attaches at an exterior body structure 16, such as a bumper or fascia, of the vehicle), multiple sensors or antenna 12a, 12b, 12n may be positioned accurately in an array of "n" sensors to increase the horizontal or vertical FOV. In accordance with the present invention, individual sensors with a FOV 13 of about 150 degrees are positioned at the carrier bracket, with a horizontal included angle 14 (HIA) between the sensors at the extreme ends of the bracket. Accordingly, the FOV of any specific array of sensors would be approximately the "Total Average FOV of Sensor+Included Opening Angle." The resulting FOV according to the example is about 195 degrees. It is envisioned that in placing sensors around the rear or front corners of the bumper/fascia, a FOV approaching 240 degrees could be achieved.

Figure 8:
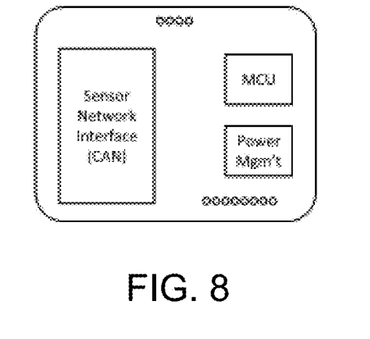
FIG. 8 is a plan view of an integrated circuit PWB of processing of radar data, suitable for use with the mounting system shown in FIG. 6.
Figure 9:
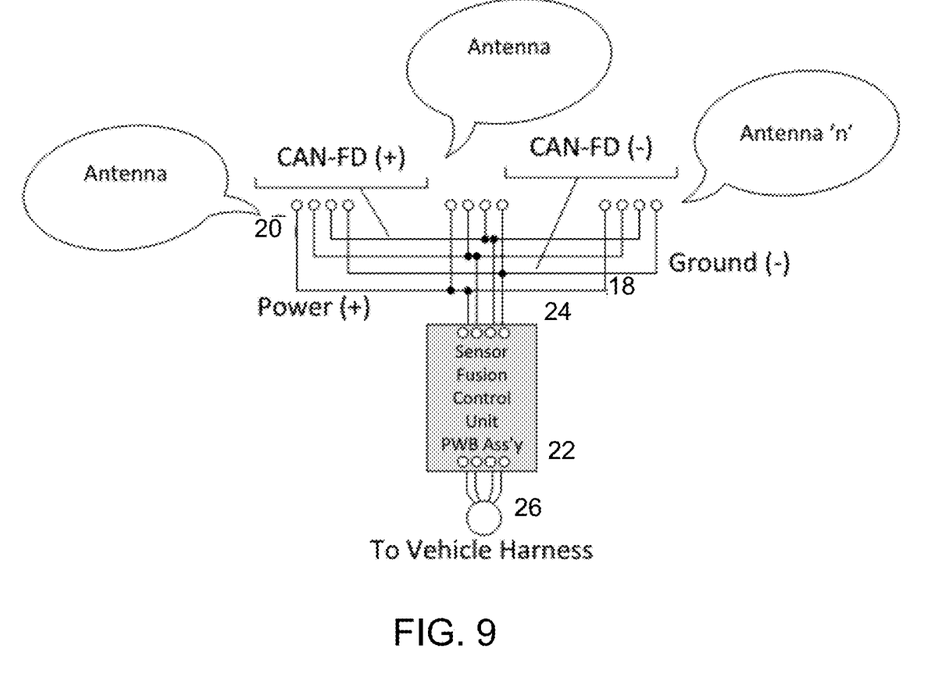
FIG. 9 is a schematic of a circuit that may be insert molded in a carrier bracket of the present invention.

In the illustrated embodiment, the antennas (FIG. 9) would be connected to a carrier bracket 15 (FIG. 6) that would provide the following features:
 lead frame for electrical connectivity 18 (FIG. 9);
 connection to permit installation 20 (FIG. 9);
 positional alignment of each sensor in elevation, separation (distance between sensors), HIA, and VIA;
 attachment to the bumper/fascia 16 (FIG. 6); and
 connection to permit a sensor fusion control unit 22 (FIG. 8), installation within the bracket 15 at location 11.

Multiple standardized short range radar antennas 12 (FIG. 7) may be placed at the bracket on a vehicle to provide complete corner coverage for the vehicle. Due to the wider field of view and the ability for radar antennas to detect objects in closer proximity to the bumper fascia, the coverage provided would be greatly improved relative to existing technologies. Through the use of long baseline interferometry and interlacing fields of view, increased positional accuracy could be realized and point cloud mapping could be used to provide a precise classification of the situation and surrounding objects.

The carrier thus provides a frame at which the multiple antenna can be attached (or insert molded or otherwise established thereat or therein). The antenna (and/or sensors including transmitters) are electrically connected to a sensor fusion control unit 22 at a connector 24. The sensor fusion control unit 22 of the carrier is configured to be electrically connected to a wiring harness 26 of the vehicle. Thus, the carrier allows for mounting of multiple sensors or antenna in a desired pattern so that the multiple sensors are mounted to the vehicle as a unit or module. The multiple sensors are electrically connected to a common control board, which is electrically connected to a wire harness or electrical connector of the vehicle. The electrical connections between the sensors or antennas and the common board may be made via electrical connectors that are part of the carrier (such as wires attached at and along the carrier frame and/or such as electrically conductive elements that are insert molded in the carrier frame). Thus, the multiple sensors or antennas can be mounted at the vehicle in a desired configuration via a single mounting of the bracket to the vehicle and via a single electrical connection to an electrical connector of the vehicle.

Thus, the present invention provides a carrier bracket that provides for the positioning of an array of radar sensors or an array of antennas in accurate locations relative to one another. The carrier bracket is attached at a bumper/fascia of a vehicle, such as by using ultrasonic, adhesive, thermal bonding or other similar means to position the bracket on the vehicle. The carrier bracket includes integrated electrical connections and circuits to support an array of antennas, with the circuits and electrical connections integrated in the carrier bracket such as by using an insert molding process. The electrical connection of the antennas to a control unit may be achieved with additional circuits integrated in the bracket, wire a wiring harness of the vehicle electrically connecting to the vehicle.

The sensing system may comprise antenna arrays connected to a localized ECU that is capable of process detection of individual antennas, combining detections within the antenna patterns of horizontal interlaced sensor FOVs to provide an improved positional accuracy. Optionally, the sensing system may comprise antenna arrays connected to the localized ECU that is capable of process detection of individual antennas, combining detections within the antenna patterns of vertical interlaced antenna FOVs to provide an improved positional object height measurement and three dimensional (3D) imaging.

The sensing system (mounted at a vehicle via the mounting system of the present invention) is thus capable of providing short range function ADAS functions without sensing components visible on the external surfaces of the vehicle. The system mounts or deploys two or more RF based antennas to provide 360 degrees coverage around a vehicle, and connected using a high bandwidth communication protocol or proprietary network communication protocol. The sensing system supports either sequential transmission or simultaneous transmission of all antenna receivers or groups of receivers providing coverage within the FOV. The sensing system thus deploys two or more RF based antennas to collaboratively provide short range detection for functions such as automated parking, blind spot detection, cross traffic alert, lane change and merge aid, automatic emergency braking, pedestrian detection, turn assist, intersection collision mitigation, and/or the like.

Therefore, the present invention provides a carrier bracket that permits the use of multiple sensing devices, and that can be easily customized for vehicle design attributes (corner profiles, fascia shape, styling aspects). By maintaining a standard antenna capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors maybe realized with wiring harness or pigtails integrated to the carrier bracket.

The RF sensing system implemented by the mounting system of the present invention may be part of a sensing system (such as described in U.S. patent application Ser. No. 15/467,247, incorporated above) for a vehicle that utilizes a plurality of RF sensors disposed or arranged at the vehicle to provide a 360 degree field of sensing around the vehicle. The sensing system may include a plurality of RF sensors that are similar in size to existing ultrasonic sensors currently in use for automotive detection, and that are capable of detecting objects in close proximity to the vehicle or other application.

The RF sensors of the sensing system are capable of being located behind RF transmissive material. Thus, the sensing system is operable to provide short range function ADAS functions without sensing components visible on the external surfaces of the vehicle. For example, an RF sensor, capable of short range detection operating as a single transmitting and a single receiving device, can be located behind a vehicle bumper or fascia.

The sensing system of the present invention may utilize aspects of the systems described in U.S. Pat. Nos. 8,013,780 and/or 5,949,331 and/or International Publication No. WO 2011/090484 and/or U.S. Publication No. US-2010-0245066 and/or U.S. patent applications, Ser. No. 15/446,220, filed Mar. 1, 2017, and/or Ser. No. 15/420,238, filed Jan. 31, 2017, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system of a vehicle, said sensing system comprising:
a mounting carrier that supports a plurality of sensor units;
wherein said mounting carrier is configured to be disposed at the vehicle so that said plurality of sensor units have respective fields of sensing exterior of the vehicle;
wherein said mounting carrier comprises structure to support said plurality of sensor units at an exterior portion of the vehicle so as to provide a desired field of sensing of said sensors when said mounting carrier is mounted at the vehicle;
wherein said mounting carrier comprises an electrical connector that is configured to electrically connect to an electrical connector of the vehicle when said mounting carrier is mounted at the vehicle;
wherein said sensor units are electrically connected to a common circuit element that is electrically connected to said electrical connector of said mounting carrier;
a control, wherein, with said mounting carrier mounted at the vehicle, outputs of said sensor units are received at said circuit element and communicated to said control, and wherein said control, responsive to said outputs of said sensor units, determines the presence of one or more objects exterior the vehicle and within the field of sensing of at least one of said sensor units; and
wherein said sensor units comprise sensor arrays connected to a control unit of the vehicle capable of process detection of individual sensors of the sensor arrays, combining detections within the antenna patterns of vertical interlaced sensor fields of sensing to provide an improved positional object height measurement and 3D imaging.

2. The sensing system of claim 1, wherein said mounting carrier provides for the positioning of an array of radar sensor units in accurate locations relative to one another.

3. The sensing system of claim 1, wherein said mounting carrier is attached to the exterior portion of the vehicle.

4. The sensing system of claim 3, wherein the exterior portion of the vehicle comprises a bumper of the vehicle.

5. The sensing system of claim 3, wherein said mounting carrier is attached to the exterior portion of the vehicle using ultrasonic welding, an adhesive or thermal bonding.

6. The sensing system of claim 1, wherein said mounting carrier includes integrated electrical connectors that electrically connect said sensor units to said common circuit element.

7. The sensing system of claim 6, wherein said integrated electrical connectors are insert molded in said mounting carrier.

8. The sensing system of claim 6, wherein said common element is insert molded in said mounting carrier.

9. The sensing system of claim 1, wherein said sensor units comprise an array of sensors positioned, with said mounting carrier mounted at the vehicle, to provide a horizontal field of sensing greater than the horizontal field of sensing of the individual sensor units.

10. The sensing system of claim 1, wherein said sensor units comprise an array of sensors positioned, with said mounting carrier mounted at the vehicle, to provide a vertical field of sensing greater than the vertical field of sensing of the individual sensor units.

11. The sensing system of claim 1, wherein, with said mounting carrier mounted at the vehicle, said sensor units are supported at said mounting carrier at different heights, and wherein said sensing system obtains height data.

12. The sensing system of claim 1, wherein said sensor units comprise sensor arrays connected to a control unit of the vehicle capable of process detection of individual sensors of the sensor arrays, combining detections within the antenna patterns of horizontal interlaced sensor fields of sensing to provide an improved positional accuracy.

13. The sensing system of claim 1, wherein said sensor units are part of a sensing system capable of providing short range driver assist system functions without sensing components visible on the external surfaces of the vehicle.

14. The sensing system of claim 1, wherein said sensor units are part of a sensing system having multiple RF based sensors to provide 360 degree coverage around the vehicle and connected using a high bandwidth communication protocol or proprietary network communication protocol.

15. The sensing system of claim 14, wherein said sensing system supports either sequential transmission or simultaneous transmission of all sensor units or groups of sensor units providing coverage within the field of sensing.

16. The sensing system of claim 14, wherein said sensing system provides short range detection for at least one of automated parking, blind spot detection, cross traffic alert, lane change and merge aid, automatic emergency braking, pedestrian detection, turn assist, and intersection collision mitigation.

17. A sensing system of a vehicle, said sensing system comprising:
  a mounting carrier that supports a plurality of sensor units;
  wherein said mounting carrier is configured to be disposed at the vehicle so that said plurality of sensor units have respective fields of sensing exterior of the vehicle;
  wherein said mounting carrier comprises structure to support said plurality of sensor units at an exterior portion of the vehicle so as to provide a desired field of sensing of said sensors when said mounting carrier is mounted at the vehicle;
  wherein said mounting carrier comprises an electrical connector that is configured to electrically connect to an electrical connector of the vehicle when said mounting carrier is mounted at the vehicle;
  wherein said sensor units are electrically connected to a common circuit element that is electrically connected to said electrical connector of said mounting carrier;
  wherein, with said mounting carrier mounted at the vehicle, said sensor units are supported at said mounting carrier at different heights, and wherein said sensing system obtains height data;
  wherein said mounting carrier includes integrated electrical connectors that electrically connect said sensor units to said common circuit element;
  wherein said circuit element comprises a sensor fusion control unit that receives outputs of said sensor units and is operable to communicate an output to a control of the vehicle; and
  wherein, with said mounting carrier mounted at the vehicle, outputs of said sensor units are received at said circuit element and communicated to said control, and wherein said control, responsive to said outputs of said sensor units, determines the presence of one or more objects exterior the vehicle and within the field of sensing of at least one of said sensor units.

18. The sensing system of claim 17, wherein said sensor units comprise a plurality of sensor antennas.

19. A sensing system of a vehicle, said sensing system comprising:
  a mounting carrier that supports a plurality of sensor units;
  wherein said mounting carrier is configured to be disposed at the vehicle so that said plurality of sensor units have respective fields of sensing exterior of the vehicle;
  wherein said mounting carrier comprises structure to support said plurality of sensor units at an exterior portion of the vehicle so as to provide a desired field of sensing of said sensors when said mounting carrier is mounted at the vehicle;
  wherein said mounting carrier comprises an electrical connector that is configured to electrically connect to an electrical connector of the vehicle when said mounting carrier is mounted at the vehicle;
  wherein said sensor units are electrically connected to a common circuit element that is electrically connected to said electrical connector of said mounting carrier;
  wherein said sensor units comprise an array of sensors positioned, with said mounting carrier mounted at the vehicle, to provide a horizontal field of sensing greater than the horizontal field of sensing of the individual sensor units;
  wherein said sensor units comprise an array of sensors positioned, with said mounting carrier mounted at the vehicle, to provide a vertical field of sensing greater than the vertical field of sensing of the individual sensor units;
  wherein, with said mounting carrier mounted at the vehicle, said sensor units are supported at said mounting carrier at different heights, and wherein said sensing system obtains height data;
  wherein said mounting carrier includes integrated electrical connectors that electrically connect said sensor units to said common circuit element;
  wherein said circuit element comprises a sensor fusion control unit that receives outputs of said sensor units and is operable to communicate an output to a control of the vehicle; and
  a control, wherein, with said mounting carrier mounted at the vehicle, outputs of said sensor units are received at said circuit element and communicated to said control and wherein said control, responsive to said outputs of said sensor units, determines the presence of one or more objects exterior the vehicle and within the field of sensing of at least one of said sensor units.

\* \* \* \* \*